Sept. 10, 1968  TAKASI SAKURAI  3,400,520
FILTER MATERIAL FOR INTERNAL COMBUSTION ENGINE AIR CLEANER
Filed April 24, 1967
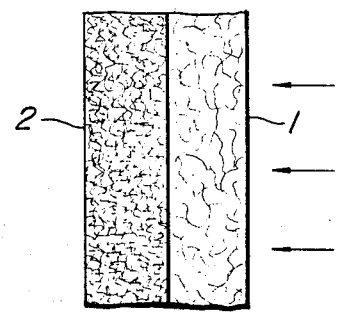
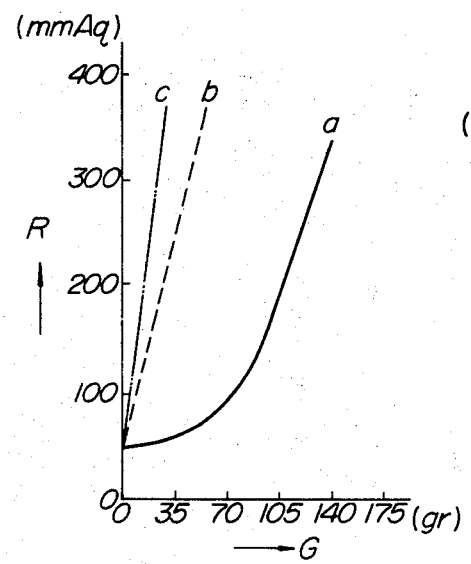
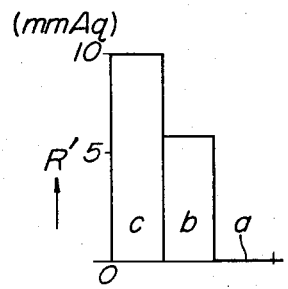
INVENTOR
Takasi Sakurai
BY Cushman, Darby & Cushman
ATTORNEYS United States Patent Office 3,400,520
Patented Sept. 10, 1968

3,400,520
FILTER MATERIAL FOR INTERNAL COMBUSTION
ENGINE AIR CLEANER
Takasi Sakurai, Kariya-shi, Japan, assignor to Nippon
Denso Company Limited, Kariya-shi, Japan, a corporation of Japan
Filed Apr. 24, 1967, Ser. No. 633,083
Claims priority, application Japan, Nov. 16, 1966,
41/105,508
7 Claims. (Cl. 55—487)

ABSTRACT OF THE DISCLOSURE

A filter material for internal combustion engine air cleaner, which consists of an air inlet layer of non-woven fabric having a relatively low amount of fibers used per unit area and an air outlet layer of non-woven fabric having a relatively high amount of fibers used per unit area, both layers being secured with an adhesive, in which a dust retention capacity of the filter material is enhanced by using the fibers having the same size mainly in the non-woven fabrics for both layers; a filtration efficiency of the filter material is enhanced by mixing a small amount of finer fibers into the non-woven fabrics; and the change with time in the filtration efficiency of the filter material is made even by using at least two kinds of fibers showing mutually different tendencies in the change with time in the filtration efficiency, at least in the air inlet layer.

Background of the invention (1) *Field of the invention.*—This invention relates to a filter material for internal combustion engine air cleaner having an improved structure, which is to be mounted on an automobile.

(2) *Description of the prior art.*—Filter paper, felt, non-woven fabrics of synthetic fibers, etc. have been heretofore used as a filter material for internal combustion engine air cleaner, and in order to improve the filtration efficiency, the density of the filter material has been made evenly high in these filter materials. As a result, the filtration resistance is liable to be increased in a very short time, and an abnormal clogging state is shortly brought about. Thus, the filter material must be cleaned in a very short interval. Such is the disadvantage of the conventional filter material. Particularly, the filter paper has a low physical strength and thus is often damaged when cleaned. Further, it is well known to use two layers, that is, a coarse layer of fibers having a larger size and a dense layer of fibers having a smaller size, stagewise as a filter material in order to prevent an increase in the filtration resistance in a short time. However, in view of the dust retention capacity, one of the properties, which indicates the characteristics of the filter material, there is evidently an optimum value in the size of the fiber, and thus to use two fibers having mutually different sizes in the filter material as in the prior art is disadvantageous, because the dust retention capacity is inevitably lowered. Further, in view of the change with time in the filtration efficiency, one of the properties which indicates the characteristics of the filter material, only one kind of fibers cannot evidently keep even the change with time in the filtration efficiency, and thus to use only one kind of the fibers in the filter material as in the prior art is disadvantageous because the change with time in the filtration efficiency cannot be kept even.

Summary of the invention

To eliminate the foregoing disadvantages of the prior art, the present invention provides a novel filter material consisting of an air inlet layer of non-woven fabric having a relatively low amount of fibers used per unit area and an air outlet layer of non-woven fabric having a relatively high amount of fibers used per unit area, both layers being secured with an adhesive, in which both non-woven fabrics are mainly comprised of the fibers having the same size, and a small amount of fine fibers is added to the non-woven fabrics. The amount of fibers used per unit area of the respective non-woven fabric is made even by mixing fibers well. Further, in the present invention, at least the non-woven fabric for the air inlet layer is comprised of at least two kinds of fibers different in quality. By such arrangement, the present invention can provide a novel filter material having a high filtration efficiency, a high dust retention capacity and an even change with time in the filtration efficiency.

Brief description of the drawing

FIG. 1 shows a vertical cross-sectional view of the filter material for air cleaner according to the present invention, and FIGS. 2 and 3 show a comparative diagram of filtration resistance test and a comparative diagram of repeated filtration resistance test of the present filter material with the conventional ones respectively.

Description of the preferred embodiment

Performance of the filter material depends upon the change with time in the filtration efficiency, the dust retention capacity, and the filtration efficiency.

Further, the change with time in the filtration efficiency depends upon the kind of the fiber used in the non-woven fabric. For example, the non-woven fabric prepared only from polyester synthetic fibers has a poor filtration efficiency at the initial stage, but has a better efficiency at the final stage. On the other hand, the non-woven fabric prepared only from polyvinyl alcohol synthetic fibers has a better filtration efficiency at the initial stage, but has a poor efficiency at the final stage.

The filtration efficiency of the non-woven fabric becomes poor if the size of the fiber becomes large. That is, if the fine fibers are used, the filtration efficiency is better. However, the dust retention capacity (which is in a correlation with the filtration resistance) becomes poor if fine fibers are used, and also becomes poor if the size of the fibers is too large.

In view of the dust retention capacity, the fibers for the non-woven fabrics for the filter material have an optimum size, and it is found that the non-woven fabrics consisting of the optimum size, but having different amounts of fibers used per unit area are suitable for the filter material. The change with time in the filtration efficiency depends upon the kind of the fiber, and can be never improved so far as only a single kind of the fibers is used. Thus, it is found necessary to blend different kinds of fibers in order to keep even the change with time in the filtration efficiency. Further, it is found better to mix a small amount of fine fibers into the non-woven fabric in order to improve the filtration efficiency.

The present filter material comprises, in view of the above-mentioned findings, an air inlet layer of non-woven fabric having a relatively low amount of fibers used per unit area and an air outlet layer of non-woven fabric having a relatively high amount of fibers used per unit area, both layers being secured with an adhesive.

Fibers having the same size are mainly used in the non-woven fabrics for both layers in order to increase the dust retention capacity of the filter material, and further a small amount of fine fibers is mixed into the non-woven fabric in order to increase the filtration efficiency of the filter material.

Furthermore, two kinds of fibers having different tendencies in change with time in the filtration efficiency are used at least in the air inlet layer of the present filter material in order to make even the change with time in the filtration efficiency of the filter material.

As fibers for the non-woven fabric of the present invention, relatively long fibers, which are 25 to 55 mm. long, are preferable. Polyester or polyvinyl alcohol synthetic fibers, rayon, or intensified rayon is used in the non-woven fabric for the air inlet layer, and polyvinyl alcohol synthetic fiber, rayon, or intensified rayon is used in the non-woven fabric for the air outlet layer.

In the present invention, the fibers having a size in a range of 3.0 to 4.0 deniers are mainly used in the non-woven fabrics for both layers, and in addition, a small amount of the fiber having a size in a range of 1.0 to 2.0 deniers is also used. The term "1.0 denier" used herein refers to a fiber having a weight of 0.05 g. and a length of 450 m.

The present non-woven fabric for the air inlet layer preferably has such a blend proportion as 40–50% of polyester synthetic fiber, 60–50% of polyvinyl alcohol synthetic fiber, rayon, or intensified rayon, and that for the air outlet layer preferably has such as 100% polyvinyl alcohol-based synthetic fiber, or a combination of 20–40% of polyvinyl alcohol synthetic fibers and 80–60% of rayon or intensified rayon. In the present invention, by changing the blend proportion of the fibers, a filter material having a desired cleaning efficiency can be prepared.

The density of the non-woven fabric can be defined by the amount of fibers per unit area (g./m.$^2$) when the thickness of the non-woven fabric is constant. That is, the density of the non-woven fabric depends upon the amount of the fibers. In the present invention, the amount of fibers per unit area of the non-woven fabric for the air inlet layer is preferably 50–100 g./m.$^2$, and that for the air outlet layer is preferably 80–110 g./m.$^2$. The amount of fibers used per unit area of the filter material prepared by bonding said two non-woven fabrics is 170–430 g./m.$^2$ (including the weight of the adhesive) when the thickness of the filter material is 2.0–4.0 mm. If the weight of the adhesive is deducted therefrom, the amount of fibers use per unit area becomes 140–210 g./m.$^2$.

If the present invention, an emulsion type adhesive is used to secure both layers, and particularly use of acryl-based emulsion type adhesive is preferable. The non-woven fabrics are usually bonded spot-wise.

The present filter material is hereunder explained in detail with reference to example.

EXAMPLE

FIG. 1 shows a structure of the present filter material, in which numeral 1 is an air inlet layer and numeral 2 is an air outlet layer. The air inlet layer consists of a non-woven fabric having a relatively low amount of fibers used per unit area and the air outlet layer consists of a non-woven fabric having a relatively high amount of fibers used per unit area. The detail of said non-woven fabrics is shown below:

| Fibers used | Size of fibers (deniers) | Blend proportion (percent) | Amount of fibers per unit area (g./m.$^2$) |
| --- | --- | --- | --- |
| Coarse non-woven fabric: | | | |
| A(polyester) | 3.0 | 40 | } 90 |
| B(polyvinyl alcohol) | 3.0 | 50 | |
| Do | 1.4 | 10 | |
| Dense non-woven fabric: | | | |
| B(polyvinyl alcohol) | 3.0 | 80 | } 110 |
| Do | 1.4 | 20 | |

The air inlet layer 1 of non-woven fabric uniformly prepared and blended is bonded to the air outlet layer 2 of non-woven fabric prepared and blended using an acrylic-based emulsion type adhesive. The filter material thus prepared has a cleaning efficiency of more than 99%.

The reason why two kinds of synthetic fibers A(polyester) and B(polyvinyl alcohol) are used in example, is that, when only the synthetic fibers A(polyester) are used in the filter material, the filtration efficiency at the final stage is as high as 90%, but that at the initial stage is as low as 82%, and when only the synthetic fibers B(polyvinyl alcohol) are used, the filtration efficiency at the initial stage is as high as 92%, but that at the final stage is as low as 80%, and thus two kinds of synthetic fibers, that is, A(polyester) and B(polyvinyl alcohol) are used in the present invention to obtain a filter material having an even change with time in the filtration efficiency. Further, the reason why both non-woven fabrics are comprised of the fibers having the same size, that is, 3.0 deniers, is that the maximum retention of dust (g.) can be attained at 3.0 deniers. Furthermore, the reason why a small amount of fine fibers having 1.4 deniers is to increase the filtration efficiency.

In this way, the present invention can provide a filter material having a high filtration efficiency, a high dust retention capacity and a tendency in even change with time in the filtration efficiency.

Results obtained by conducting a comparative test of the present filter material with various conventional filter materials, when used in the air cleaner for internal combustion engine, are explained with reference to FIGS. 2 and 3. The filtration resistance test is conducted according to SAE Test Procedure and FIG. 2 shows the result obtained under such test conditions that the flow rate of air is 3.5 m.$^3$/min.; the dust concentration is 1 g./m.$^3$ (according to JIS Z 8901–8); and the area of filter material is 3.224 cm.$^2$. The abscissa shows the filtration resistance R, and the ordinate shows the dust retention amount G. In FIG. 2, "$a$" represents the present filter material; "$b$" represents the conventional felt and the non-woven fabric of synthetic fiber; and "$c$" is the filter paper. As is seen from FIG. 2, the present filter material has a remarkably low filtration resistance over a long period of time, and an even change with time in the filtration efficiency at the same time. Further, the dust retention amount G of the present invention is very high, as compared with those attained in the conventional filter materials "$b$" and "$c$." FIG. 3 shows the result of comparative test of the reproducibility of the filter materials used in the comparative filtration resistance test as in FIG. 2 and cleaned by the compressed air. In FIG. 3, the filtration resistance increment R' becomes lower in order of the filter paper "$c$," felt and non-woven fabric of synthetic resin "$b$" to present filter material "$a$." In this way, the reproducibility of the present filter material is also better than those of other filter materials.

As stated above, the present filter materials has the following remarkable effects:

(1) Both non-woven fabrics having a relatively low amount of fibers used per unit area and that having a relatively high amount of fibers used per unit area consist mainly of the fibers having the same optimum size, and thus the dust retention capacity of the present fiber material can be remarkably increased, as compared with those obtained with the conventional fabrics consisting of fibers having different sizes.

(2) As a small amount of fine fibers is mixed in the non-woven fabric, the filtration effect can be enhanced.

(3) As at least the non-woven fabric for the air inlet layer consists of two kinds of fibers having different tendencies in the change with time in the filtration efficiency, the change with time in the filtration efficiency of the filter material is made even.

(4) As the present filter material consists of the inlet layer of non-woven fabric having a low amount of fibers used per unit area and the air outlet layer of non-woven fabric having a high amount of fibers used per unit area, the reproducibility is better. Further, as no grease is required, the present filter material is simple in handling when used as a filter material for automobile air cleaner.

What is claimed is:

1. A filter material for internal combustion engine air cleaner which comprises an air inlet layer of non-woven fabric having a relatively low amount of fibers per unit area and an air outlet layer of non-woven fabric having a relatively high amount of fibers per unit area, said layers being secured together with an adhesive, each of said fabrics being comprised of a major amount of relatively coarse fibers and a minor amount of relatively fine fibers and at least the non-woven fabric of the air inlet layer comprising a mixture of at least two synthetic fibrous materials having relatively different tendencies to change with time in filtration efficiency.

2. The filter material of claim 1 wherein the amount of fibers per unit area in said air inlet layer is between 50–100 g./m.$^2$ and wherein the amount of fibers per unit area in said air outlet layer is between 80–110 g./m.$^2$, said layers being spot-wise bonded by an adhesive whereby said filter material has a thickness of 2–4 mm. and the amount of fibers and adhesive per unit area is between 170–430 g./m.$^2$.

3. The filter material of claim 1 wherein the relatively coarse fibers have a size ranging from 3.0–4.0 deniers and the relatively fine fibers have a size ranging from 1.0–2.0 deniers.

4. The filter material of claim 3 wherein said non-woven fabric of the air inlet layer comprises a mixture of polyester and polyvinyl alcohol fibers.

5. The filter material of claim 4 wherein said non-woven fabric of the air outlet layer comprises a fibrous material selected from the group consisting of polyvinyl alcohol fibers, rayon fibers and intensified rayon fibers.

6. The filter material of claim 5 wherein said air inlet layer comprises a mixture of 40–50% polyester fibers and 60–50% polyvinyl alcohol fibers and said air outlet layer consists essentially of polyvinyl alcohol fibers.

7. The filter material of claim 5 wherein said air inlet layer comprises a mixture of 40–50% polyester fibers and 60–50% polyvinyl alcohol fibers and said air outlet layer comprises a mixture of 20–40% polyvinyl alcohol fibers 80–60% of a member selected from the group consisting of rayon fibers and intensified rayon fibers.

References Cited
UNITED STATES PATENTS

| | | | |
|---|---|---|---|
| 2,521,984 | 9/1950 | Lang | 55—486 |
| 2,888,095 | 5/1959 | Perrini et al. | 55—524 |
| 2,933,154 | 4/1960 | Lauterbach | 55—486 |
| 2,988,168 | 6/1961 | Wittemeier et al. | 55—488 |
| 3,063,787 | 11/1962 | Rynkiewicz | 161—172 |

FOREIGN PATENTS 1,018,379  1/1966  Great Britain.

HARRY B. THORNTON, *Primary Examiner.*

B. NOZICK, *Assistant Examiner.*